Patented Oct. 7, 1930

1,777,737

UNITED STATES PATENT OFFICE

WINFIELD SCOTT AND WILLIAM P. TER HORST, OF AKRON, OHIO, ASSIGNORS TO THE RUBBER SERVICE LABORATORIES COMPANY, OF AKRON, OHIO, A CORPORATION OF OHIO

RUBBER-VULCANIZATION PROCESS

No Drawing. Application filed December 20, 1926. Serial No. 156,065.

The present invention is directed to an improvement in the process of vulcanizing rubber by employing as an accelerator of that process certain aromatic derivatives of guanidine and particularly the ethoxy-aryl-substituted-guanidines possessing basic characteristics. The invention will be understood from the following description and examples wherein the invention is fully set forth and described.

Certain aryl-substituted-guanidines, such as tri-phenyl-guanidine, di-phenyl-guanidine, di-o-tolyl-guanidine, and mixed aryl guanidines such as phenyl-o-tolyl-guanidine have heretofore been disclosed as commercial accelerators of the rubber vulcanization process. We have now found that when certain radicals or groups are introduced into the aryl group of the substituted guanidines, and preferably such groups as the ethoxy and other like groups which do not materially decrease the basicity of the guanidines, a type of compound is produced. These compounds comprise a class of accelerators that are capable of wide use in the rubber vulcanization process as is hereinafter set forth in detail to produce rubber products of high quality and of commercial characteristics. The compounds impart exceptional age-resisting properties to the vulcanized rubber compound which are markedly superior to those exhibited by stocks cured with the aid of the aryl guanidines themselves. Other points of superiority in the commercial use of these compounds over the simple aryl guanidines heretofore employed as vulcanization accelerators will be apparent from the examples hereinafter set forth.

An example of one of our preferred type of accelerators is di-p-phenetidyl-guanidine. This compound may be manufactured by first reacting p-phenetidine with carbon bisulphide and then obtaining the desired guanidine derivative by the de-sulphurization and subsequent amidation with ammonia of the thiourea so obtained. Another method of preparing this compound is by the reaction of cyanogen chloride upon p-phenetidine. In operating this process, a stream of cyanogen chloride is passed through p-phenetidine maintained preferably at a temperature of from 100 to 140° C. The cyanogen chloride is passed through the phenetidine until approximately 90% of the latter has been reacted. It is desirable to discontinue the reaction at this point in order that the unchanged phenetidine may maintain the reaction product soft enough to permit its ready removal from the reaction chamber. The reactions taking place are indicated as follows:

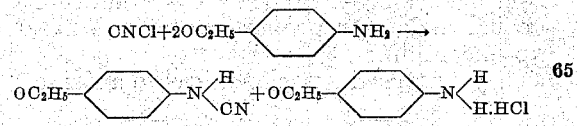

These products formed in the first stage of the process then combine, at the temperature employed, to produce

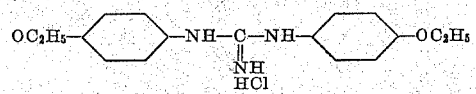

The product which is the hydrochloride of di-p-phenetidyl-guanidine may be purified and transformed into the base desired by dissolving the hydrochloride in water in which the unchanged p-phenetidine is substantially insoluble. The undissolved material is therefore separated from the solution and the water solution is then extracted with benzol, toluol or other suitable solvent to substantially remove any traces of p-phenetidine remaining therein. The solution, cooled approximately to atmospheric temperature is then run into an excess of a 10 to 15% solution of an alkali, such as caustic soda, whereby the free substituted guanidine is precipitated. The product is then filtered, washed with water and dried at approximately 60° or by vacuum drying. The resulting compound is a white solid which melts at from 125.2 to 126.2° C.

Another example of one of our new type of accelerating compounds is phenyl-p-phenetidyl-guanidine which may be manufactured by the desulphurization and subsequent amidation of phenyl-phenetidyl-thiourea. This thio-urea is prepared by dissolving substantially one molecular proportion of phenyl-mustard oil (135 parts) in a suitable solvent, such as alcohol, benzol and the like and adding to this solution one molecular proportion (137 parts) of p-phenetidine. The reaction starts immediately and being an exothermic change, is preferably carried out in an apparatus supplied with a reflux condenser to prevent undue loss of solvent. The thio-urea is also manufactured by reacting carbon bisulphide on a mixture of substantially equal molecular proportions of aniline and p-phenetidine. The thio-urea is practically insoluble in the solvents mentioned and separates therefrom as a finely crystalline mush. The thio-urea so obtained is then transformed, as was previously mentioned, into the desired guanidine by de sulphurization and subsequent amidation with ammonia. Phenyl-p-phenetidyl-guanidine is a white product melting at from 107.8 to 108.6° C. and having the formula

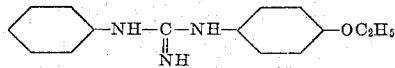

This product has also been prepared by reacting cyanogen chloride on a mixture of equal molecular proportions of aniline and p-phenetidine.

Symmetrical tri-phenetidyl-guanidine

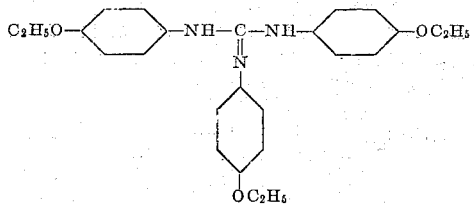

is manufactured by reacting carbon bisulphide on p-phenetidine to prepare di-phenetidyl-thio-urea. One molecular proportion of this thio-urea is then desulphurized and amidated in the presence of one molecular proportion of p-phenetidine, preferably dissolved in a solvent such as benzol, toluol or other suitable medium. The product is soluble in the hot solution and is removed therefrom by simple evaporation. The sym-tri-p-phenetidyl-guanidine so obtained is a white product melting at from 186 to 188° C.

The unsymmetrical tri-phenetidyl-guanidine is manufactured by the cyanogen chloride process hereinbefore described. Cyanogen chloride is passed into a mixture of equal molecular proportions of p-phenetidine and di-p-phenetidyl-amine. The product so obtained has the following formula:

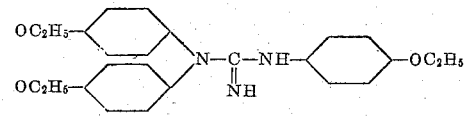

A further example of another type of compound included in the present invention is mono-p-phenetidyl-guanidine

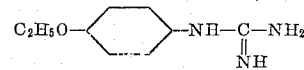

This compound is manufactured from p-phenetidine-hydrochloride and cyanamide by heating the mixture in a closed tube preferably in the presence of a small proportion of a suitable dispersing agent. The product is then treated with caustic soda solution to decompose the salt and obtain the free base.

In a manner similar to that described in making phenyl - phenetidyl - guanidine, o-tolyl - p - phenetidyl-guanidine melting at from 130.6 to 132.4° C. has been obtained. The melting points of the various compounds indicated hereinbefore have in all cases been determined upon the commercial material, that is, upon the base obtained by precipitation of the guanidine from its hydrochloride by caustic and have not been further purified.

Mono-p-phenetidyl-biguanide is an example of another type of an aromatic guanidine containing an alkoxy group. This compound, having a formula

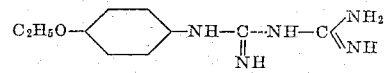

is manufactured by heating a water solution of p-phenetidine-hydrochloride and di-cyan-di-amide. The product is precipitated from the water solution by caustic soda or other suitable alkali and is white in color and melts at approximately 160.4 to 161.2° C. The di and tri-phenetidyl-bi-guanides may also be prepared as well as substituted bi-guanides containing one or more phenetidyl groups in addition to other aryl groups.

Ortho or meta-phenetidine may be employed in place of the p-phenetidine particularly mentioned in the examples, or the so-called "commercial" mixed phenetidines, comprising a mixture of approximately 70% p- and 30% o-phenetidine may likewise be used. Moreover, the ethyl group in the phenetidines described may be replaced by other alkyl groups and the resulting compounds employed in place of the phenetidine set forth in the various examples. Likewise in place of aniline used in certain of the examples, other primary aromatic amines such as the toluidines, xylidines and the like may be employed and the corresponding homologues of the particular compounds set forth may be obtained. The products in every case will be aromatic guanidines wherein is substituted at least one alkoxy grouping in the aromatic group present.

The various compounds and analogous substances hereinbefore set forth and discussed in detail, may be employed as commercially practicable accelerators of the rubber vulcanization process, as are shown by the following examples. A rubber mix illustrated by the compound indicated below was prepared in the customary and well known manner in which certain of the compounds hereinbefore described were employed as accelerators and compared with results obtained by compounding a similar stock using di-phenyl-guanidine as an accelerator, the stocks were as follows:

|  | A | B | C |
|---|---|---|---|
| Pale crepe rubber | 100 | 100 | 100 |
| Zinc oxide | 5 | 5 | 5 |
| Sulfur | 3.5 | 3.5 | 3.5 |
| Di-phenyl-guanidine | .5 | 0 | 0 |
| Di-p-phenetidyl-guanidine | 0 | .708 | 0 |
| Phenyl-p-phenetidyl-guanidine | 0 | 0 | .604 |

In the above examples, the quantities taken indicate parts by weight of the various ingredients. The accelerators are employed in an amount proportional to their molecular weights. The stocks were then vulcanized and the resulting samples were tested with the results shown below:

| Time of cure | Sample | Modulus at elongation of— | | | Tensile strength at break | Ultimate elongation in per cent |
|---|---|---|---|---|---|---|
| | | 300% | 500% | 700% | | |
| 15 minutes at a temperature given by 40 pounds of steam per sq. in. | A | 101 | 190 | 460 | 1445 | 925 |
| | B | 165 | 329 | 1248 | 2680 | 845 |
| | C | 125 | 229 | 798 | 2570 | 915 |
| 30 minutes at 40 pounds of steam per sq. in. | A | 151 | 327 | 1280 | 2765 | 860 |
| | B | 224 | 583 | 2550 | 3950 | 800 |
| | C | 200 | 461 | 1940 | 3465 | 800 |
| 45 minutes at 40 pounds of steam per sq. in. | A | 198 | 418 | 1665 | 3430 | 830 |
| | B | 295 | 808 | 3550 | 4065 | 735 |
| | C | 265 | 651 | 2670 | 3830 | 775 |

The same formula indicated above was employed for the manufacture of another set of test samples except that instead of using the accelerators indicated in the ratio of their molecular weights, there were incorporated an equal weight, namely, 0.5 parts of the accelerators specified in the respective compounds. The results obtained on testing these compounds are as follows:

| Time of cure | Sample | Modulus at elongation of— | | | Tensile strength at break | Ultimate elongation in per cent |
|---|---|---|---|---|---|---|
| | | 300% | 500% | 700% | | |
| 15 minutes at a temperature given by 40 pounds of steam pressure per sq. in. | A | 114 | 209 | 650 | 1773 | 890 |
| | B | 129 | 250 | 893 | 2135 | 880 |
| | C | 116 | 232 | 730 | 1955 | 890 |
| 30 minutes at 40 pounds steam | A | 184 | 380 | 1425 | 2660 | 830 |
| | B | 187 | 441 | 1783 | 3283 | 840 |
| | C | 189 | 414 | 1600 | 2943 | 820 |
| 45 minutes at 40 pounds steam | A | 217 | 514 | 2038 | 3340 | 820 |
| | B | 241 | 594 | 2620 | 3578 | 785 |
| | C | 234 | 561 | 2323 | 3310 | 790 |

The above rubber compound is typical of a friction stock used in tire manufacture. It is apparent from the tests that both di-p-phenetidyl-guanidine and phenyl-p-phenetidyl-guanidine when compared with di-phenyl-guanidine in proportion to their respective molecular weights and also when compared with this accelerator on an equal weight basis, exhibited accelerating powers superior to those shown by this commonly used accelerator. Its superiority is indicated in that the new compounds herein set forth produce vulcanized rubber stocks of higher quality in a shorter time of greater tensile strength at break and less stretchy than does di-phenyl-guanidine.

A further example illustrating a different type of rubber compound is the following:

|  | A | B | C |
|---|---|---|---|
| Smoked sheet rubber | 20 | 20 | 20 |
| Carcass reclaim rubber (Buckeye) (alkali process) | 65 | 65 | 65 |
| Zinc oxide | 11.625 | 11.625 | 11.625 |
| Sulfur | 3 | 3 | 3 |
| Di-o-tolyl-guanidine | 0.375 | | |
| Di-phenyl-guanidine | | .375 | |
| Di-p-phenetidyl guanidine | | | .375 |

It is to be noted that in the above stocks, one of our new type of accelerators is compared on an equal weight basis with two of the commonly known guanidine accelerators at present employed. The test results which follow show that di-p-phenetidyl-guanidine, as illustrative of our new class of accelerators is much superior to these non-substituted aryl-guanidines when employed in a typical reclaimed stock.

| Time of vulcanization | Sample | Modulus at elongation of— | | Tensile strength at break | Ultimate elongation in per cent |
|---|---|---|---|---|---|
| | | 300% | 500% | | |
| 15 minutes at a temperature given by 30 lbs. steam pressure per sq. in. | A | 311 | 752 | 1658 | 670 |
| | B | 276 | 641 | 1448 | 670 |
| | C | 333 | 821 | 1965 | 690 |
| 30 minutes at a temperature given by 30 lbs. steam pressure per sq. in. | A | 488 | 1308 | 1990 | 580 |
| | B | 419 | 1120 | 1765 | 605 |
| | C | 520 | 1398 | 2170 | 615 |

Another example which follows illustrates the use of the new compounds herein disclosed as accelerators in a typical tread compound:

|  | A | B | C | D |
|---|---|---|---|---|
| Smoked sheet rubber | 40 | 40 | 40 | 40 |
| #2 amber rubber | 13 | 13 | 13 | 13 |
| Sulfur | 1.625 | 1.625 | 1.625 | 1.625 |
| Carbon black | 20 | 20 | 20 | 20 |
| Zinc oxide | 20.25 | 20.25 | 20.25 | 20.25 |
| Mineral rubber | 3.0 | 3.0 | 3.0 | 3.0 |
| Cycline oil | 1.5 | 1.5 | 1.5 | 1.5 |
| Di-phenyl-guanidine | 0.625 | | | |
| Di-o-tolyl-guanidine | | 0.625 | | |
| Di-p-phenetidyl-guanidine | | | 0.625 | |
| Phenyl-p-phenetidyl-guanidine | | | | 0.625 |

It is to be noted that in the present example, the accelerators are being compared one with the other on an equal weight basis. The quantities of ingredients employed, as in the other examples, represent parts by weight. Cycline oil utilized as one ingredient in the above example is a blended mineral and vegetable oil employed in the rubber trade as a softener. A comparison of the relative value of the various accelerators employed is possible from the following tests:

| Time of cure | Sample | Modulus at an elongation of— | | Tensile strength at break | Ultimate elongation in per cent |
|---|---|---|---|---|---|
| | | 300% | 500% | | |
| 30 minutes at a temperature given by 40 lbs. steam pressure per sq. in. | A | 763 | 2100 | 3678 | 685 |
| | B | 1040 | 2615 | 3683 | 645 |
| | C | 760 | 2158 | 2900 | 625 |
| | D | 633 | 1878 | 3125 | 690 |
| 45 minutes at a temperature given by 40 lbs. steam pressure per sq. in. | A | 924 | 2528 | 3873 | 675 |
| | B | 1278 | 3055 | 3950 | 625 |
| | C | 971 | 2543 | 3565 | 635 |
| | D | 890 | 2428 | 3618 | 670 |
| 1 hour at a temperature given by 40 lbs. steam pressure per sq. in. | A | 1053 | 2693 | 3860 | 640 |
| | B | 1480 | 3393 | 3925 | 575 |
| | C | 1163 | 2840 | 3818 | 605 |
| | D | 1043 | 2700 | 3940 | 650 |

The above tests point out the fact that the ethoxy substituted guanidines, in this particular rubber stock which represents a typical tread compound, come up to a full cure somewhat more slowly than do stocks containing the aryl-guanidines. This, however, is a most desirable advantage inasmuch as it means that stocks containing the accelerators comprising our present invention are more readily handled in factory operations, particularly in the milling and tubing operations. By employing our preferred compounds there is a less tendency for the stock to scorch or to pre-vulcanize than would be the case if the aryl guanidines themselves were used, while the points of full cure come up to the generally employed factory process in vulcanizing tires.

The ethoxy substituted aromatic guanidines have also been shown to be better accelerators when employed in a hard rubber stock, than are the non-substituted aryl-guanidines. Hard rubber stocks were prepared according to the following formulæ:

| | A | B |
|---|---|---|
| #2 amber rubber | 20. | 20. |
| Smoked sheet rubber | 20. | 20. |
| Lime | 5. | 5. |
| Zinc oxide | 15. | 15. |
| Sulfur | 25. | 25. |
| Mineral rubber | 10. | 10. |
| Di-phenyl-guanidine | 2. | |
| Di-p-phenetidyl-guanidine | | 2. |

It was found that stock B above, yielded a hard rubber product after vulcanization for one hour and forty-five minutes at 287° F. (the temperature given by 40 pounds of steam pressure per square inch) that was better than stock A after two hours of heating under the same conditions.

The value and commercial usefulness of present day accelerators employed in the rubber industry depend not only upon the production of a vulcanized product within a reasonably short period of time which product must possess a high tensile strength and the proper degree of elasticity but depend also upon the wearing qualities of such compounds in service and also upon the deterioration in quality suffered during storage. Such properties are termed the ageing quality of the compound. It is customary at present to add to a rubber mix certain substances known as anti-oxidants to improve the ageing quality of a rubber compound but it is always preferable, if possible, to employ an accelerator which not only hastens the time of vulcanization but also imparts anti-oxidant characteristics to the rubber product. An ageing test generally employed for determining the deterioration of a rubber compound that may reasonably be expected, is known as the Bierer-Davis test. Rubber stocks were prepared containing 100 parts of pale crepe rubber, 5 parts zinc oxide, 3 parts of sulfur, 0.25 parts of thermatomic black and 0.75 parts of accelerator. As accelerators there were employed in one sample, di-o-tolyl-guanidine and in another sample, di-p-phenetidyl-guanidine. These compounds were then vulcanized in the usual manner by heating test pieces for 25, 30 and 45 minutes respectively at 287° F. The test pieces were then artificially aged by heating for 5¾ hours in an oxygen bomb using 500 pounds pressure per square inch and a temperature of 90° C. The properties of the aged and unaged samples were then determined and compared. It was found that while the stocks containing di-o-tolyl-guanidine were badly disintegrated as a result of the artificial ageing imposed, those stocks containing di-p-phenetidyl-guanidine still retained their characteristic properties and were not nearly as badly deteriorated as those containing di-o-tolyl-guanidine. The presence of alkoxy groups, such as ethoxy group in aryl guanidine accelerators, changes and greatly improves the properties of these compounds for use in rubber stocks.

Other rubber compounds have been prepared and tested in which there have been used as accelerators others of the type of compounds hereinbefore mentioned. Thus a mix was prepared comprising 100 parts of pale crepe rubber, 5 parts of zinc oxide, 3.5 parts of sulfur and 0.5 parts of an accelerator. As accelerators there were employed mono-p-phenetidyl-biguanide, o-tolyl-p-phenetidyl-guanidine, sym-tri-p-phenetidyl-guanidine, and mixed o- and p-phenetidyl-guanidines. The tests show that the various compounds all exerted an accelerating action in the respective rubber stocks.

By the term aryl substituted guanidine as appearing in the present application is meant a guanidine compound containing aromatic radicals, said aromatic radicals comprising carbon, hydrogen and oxygen only.

The examples hereinbefore set forth are to be understood as illustrative only and not at all limitative of our invention. Furthermore, the invention is not to be considered as dependent upon any theories advanced by way of explanation of the various facts and results set forth. The invention is, however, to be considered as limited only by the claims attached hereto as a part of the specification, wherein we intend to claim all novelty inherent in our invention as is permissible in view of the prior art.

What is claimed is:

1. In the vulcanization of rubber, the process which comprises heating rubber with sulfur in the presence of a phenyl substituted guanidine of basic nature and containing an ethoxy group in the para position of the phenyl nucleus.

2. In the vulcanization of rubber, the process which comprises heating rubber with sulfur in the presence of di-p-phenetidyl-guanidine.

3. In the vulcanization of rubber, the process which comprises heating rubber with sulfur in the presence of a phenetidyl guanidine.

4. In the vulcanization of rubber, the process which comprises heating rubber with sulfur in the presence of a mixture of di-p-phenetidyl-guanidine and of di-o-phenetidyl-guanidine.

5. In the vulcanization of rubber, the process which comprises heating rubber with sulfur in the presence of a mixture of phenetidyl-guanidines containing approximately 70% of di-p-phenetidyl-guanidine.

6. In the vulcanization of rubber, the process which comprises heating rubber with sulfur in the presence of a derivative of di-phenyl-guanidine containing an ethoxy group substituted in one of the phenyl groups.

7. In the vulcanization of rubber, the process which comprises heating rubber with sulfur in the presence of a derivative of di-phenyl-guanidine containing an ethoxy group substituted in both of the phenyl groups.

8. A vulcanized rubber comprising the product resulting from heating together a mixture of rubber, sulfur and a phenyl substituted guanidine of basic nature and containing an ethoxy group in the para position of the phenyl nucleus.

9. A vulcanized rubber comprising the product resulting from heating together a mixture of rubber, sulfur and a di-p-phenetidyl-guanidine.

10. A vulcanized rubber comprising the product resulting from heating together a mixture of rubber, sulfur and a phenetidyl guanidine.

11. A vulcanized rubber comprising the product resulting from heating together a mixture of rubber, sulfur and a mixture of di-p-phenetidyl-guanidine and of di-o-phenetidyl-guanidine.

12. A vulcanized rubber comprising the product resulting from heating together a mixture of rubber, sulfur and a mixture of phenetidyl-guanidines containing approximately 70% of di-p-phenetidyl-guanidine.

13. A vulcanized rubber comprising the product resulting from heating together a mixture of rubber, sulfur and a derivative of di-phenyl-guanidine containing an ethoxy group substituted in one of the phenyl groups.

14. A vulcanized rubber comprising the product resulting from heating together a mixture of rubber, sulfur and a derivative of di-phenyl-guanidine containing an ethoxy group substituted in both of the phenyl groups.

In testimony whereof we affix our signatures.

WINFIELD SCOTT.
WILLIAM P. ter HORST.